US011983378B2

(12) United States Patent
Dupre La Tour et al.

(10) Patent No.: US 11,983,378 B2
(45) Date of Patent: May 14, 2024

(54) METHOD AND DEVICE FOR TRACKING AN END OF A UTENSIL COMPRISING A RECALIBRATION OF A DISTANCE BETWEEN THE END AND A MAGNETIC OBJECT SECURELY FASTENED TO THE UTENSIL (71) Applicant: ADVANCED MAGNETIC INTERACTION, AMI, Seyssinet Pariset (FR)

(72) Inventors: Jean-Marie Dupre La Tour, Seyssinet Pariset (FR); Tristan Hautson, Seyssinet Pariset (FR)

(73) Assignee: ADVANCED MAGNETIC INTERACTION, AMI, Seyssinet Pariset (FR)

( * ) Notice: Subject to any disclaimer, the term of this patent is extended or adjusted under 35 U.S.C. 154(b) by 0 days.

(21) Appl. No.: 18/245,472

(22) PCT Filed: Sep. 17, 2021

(86) PCT No.: PCT/EP2021/075730
§ 371 (c)(1),
(2) Date: Mar. 15, 2023

(87) PCT Pub. No.: WO2022/058570
PCT Pub. Date: Mar. 24, 2022

(65) Prior Publication Data
US 2023/0350531 A1 Nov. 2, 2023

(30) Foreign Application Priority Data
Sep. 21, 2020 (FR) ...................................... 2009524

(51) Int. Cl.
*G06F 3/046* (2006.01)
*G06F 3/0354* (2013.01)
(Continued)

(52) U.S. Cl.
CPC .......... *G06F 3/046* (2013.01); *G06F 3/03545* (2013.01); *G06F 3/0383* (2013.01);
(Continued)

(58) Field of Classification Search
CPC .... G06F 3/046; G06F 3/03545; G06F 3/0383; G06F 3/04162; G06F 3/0441; G06F 3/0442; G06F 3/04144; G09G 2203/04101
See application file for complete search history.

(56) References Cited

U.S. PATENT DOCUMENTS

| 8,411,030 | B2 * | 4/2013 | Pasolini | G06F 3/0346 345/157 |
| 2008/0106520 | A1 * | 5/2008 | Free | G06F 3/0446 345/173 |

(Continued)

FOREIGN PATENT DOCUMENTS

| FR | 2988874 A1 | 10/2013 |
| WO | 2013049286 A1 | 4/2013 |

(Continued)

OTHER PUBLICATIONS

International Serach Report issued in International Application No. PCT/EP2021/075730, dated Dec. 13, 2021, with English Translation (17 pages).

(Continued)

*Primary Examiner* — David Tung
(74) *Attorney, Agent, or Firm* — Bookoff McAndrews, PLLC (57) ABSTRACT

The invention relates to a method for tracking an end of a utensil equipped with a magnetic object, wherein a parameter K(tn) representative of a contact between the end and a reference surface of a touch sensor is determined, and when contact is detected: an actual value D1(k+1) of the distance (Continued)

D1 between the end and the magnetic object is determined, on the basis of a value D1I(k+1) of a distance, referred to as the projected distance D1I between the position PA(tn) of the magnetic object and a position PI(tn) of a point of intersection between the reference surface and a straight line collinear with the magnetic moment m(tn), then the recorded value of the distance D1 is updated on the basis of the actual determined value D1(k+1) of the distance D1.

14 Claims, 5 Drawing Sheets (51) Int. Cl.
  *G06F 3/038* (2013.01)
  *G06F 3/041* (2006.01)
  *G06F 3/044* (2006.01)

(52) U.S. Cl.
  CPC ........ *G06F 3/04162* (2019.05); *G06F 3/0441* (2019.05); *G06F 3/0442* (2019.05); *G06F 2203/04101* (2013.01)

(56) References Cited

U.S. PATENT DOCUMENTS

| | | | |
|---|---|---|---|
| 2013/0009907 A1* | 1/2013 | Rosenberg | G06F 3/046 345/174 |
| 2013/0218516 A1* | 8/2013 | Yu | G06F 3/046 702/150 |
| 2015/0057969 A1* | 2/2015 | Hautson | G06F 3/046 702/150 |
| 2015/0062095 A1* | 3/2015 | Hautson | G06F 3/046 345/179 |
| 2015/0084915 A1* | 3/2015 | Hautson | G06F 3/046 345/174 |
| 2015/0168123 A1* | 6/2015 | Hautson | G01R 33/0094 702/150 |
| 2015/0168583 A1* | 6/2015 | Hautson | G01V 3/081 702/150 |
| 2015/0279537 A1* | 10/2015 | Jobert | B43L 3/00 335/302 |
| 2016/0018485 A1* | 1/2016 | Hautson | G01R 33/0094 702/57 |
| 2016/0091981 A1* | 3/2016 | Hautson | G06F 3/017 345/156 |
| 2017/0160840 A1* | 6/2017 | Joung | G06F 3/03545 |
| 2017/0336885 A1* | 11/2017 | Hautson | G06F 3/0416 |
| 2018/0313933 A1* | 11/2018 | Hautson | G01S 5/16 |
| 2020/0166668 A1* | 5/2020 | Dupre La Tour | G01V 3/08 |
| 2022/0397967 A1* | 12/2022 | Aloui | G06F 3/0414 |

FOREIGN PATENT DOCUMENTS

| | | |
|---|---|---|
| WO | 2013144338 A1 | 10/2013 |
| WO | 2014053526 A2 | 4/2014 |
| WO | 2018219891 A1 | 12/2018 |

OTHER PUBLICATIONS

Jean Renard Ward et al. "Digitizer Technology: Performance Characteristics and the Effects on the User Interface" IEEE Computer Graphics and Applications, IEEE Service Center, New York, NY, US, vol. 7, No. 4, Apr. 1, 1987 (Apr. 1, 1987), pp. 31-44 DOI: 10.1109/MCG.1987.276869 ISSN: 0272-1716, XP011363039.

* cited by examiner

METHOD AND DEVICE FOR TRACKING AN END OF A UTENSIL COMPRISING A RECALIBRATION OF A DISTANCE BETWEEN THE END AND A MAGNETIC OBJECT SECURELY FASTENED TO THE UTENSIL

CROSS-REFERENCE TO RELATED APPLICATIONS

This patent application is a continuation of and claims the benefit of priority to International Application No. PCT/EP2021/075730, filed on Sep. 17, 2021, now published as WO 2022/058570, which claims the benefit of priority of French Application No. 2009524, filed on Sep. 21, 2020, the entirety of which is incorporated herein by reference.

TECHNICAL AREA

The invention relates to the tracking, by an array of magnetometers, of the tip of a utensil equipped with a magnetic object, this utensil then being handled by a user. The invention finds an application in particular in the context of reading the line traced by the tip of a utensil on a reference surface, or even in the context of the human-machine interface and the handling of virtual objects by the user by means of the utensil.

PRIOR ART

Methods are known for tracking a utensil equipped with a magnetic object by means of an array of magnetometers, in particular in the context of reading the line traced by the tip of a utensil on a reference surface, for example the tip of a stylus, pencil or other utensil, in particular making it possible to digitize the drawing or writing created by a user handling the utensil.

Document WO 2013/144338 A1 describes an example of a method for tracking the tip of a utensil by means of an array of magnetometers that makes it possible to track the position of a magnet attached to the utensil. The distance between the magnet and the tip is fixed and does not vary over time. A computing unit makes it possible to determine the position and orientation of the magnet, then, knowing the fixed value of the magnet-tip distance, to deduce therefrom the position of the tip.

However, during the handling of the utensil by a user, sometimes this magnet may move relative to its initial position, in which case the actual value of the magnet-tip distance would be different from the initial fixed value. This may lead to an error in determining the position of the tip.

DISCLOSURE OF THE INVENTION

The object of the invention is to at least partially remedy the disadvantages of the prior art, and more particularly to propose a method and system for tracking a tip of a utensil by means of an array of magnetometers, which makes it possible to reduce the error in determining the position of the tip when the distance between the tip and a magnetic object securely fastened to the utensil is modified during the handling of the utensil.

To do this, the subject matter of the invention is a method for tracking a first end of a utensil handled by a user, a magnetic object being securely fastened to the utensil and separated from the first end along a longitudinal axis $\Delta$ of the utensil by a first non-zero distance, the magnetic object having a magnetic moment $\underline{m}$ collinear with the longitudinal axis $\Delta$, the method including the following steps:

handling of the utensil by a user, the first end being alternately in contact and not in contact with a reference surface, measuring a magnetic field emitted by the magnetic object at different successive measurement instants, by means of an array of magnetometers securely fastened to the reference surface;

determining a state vector $X_A(t_n)$ representative of the position $P_A(t_n)$ and the magnetic moment $m(t_n)$ of the magnetic object, on the basis of the measurements of the magnetic field;

determining the position $P_P(t_n)$ of the first end of the utensil on the basis of the state vector $X_A(t_n)$ and a previously recorded value of the first distance between the first end and the magnetic object.

According to the invention, the first distance between the first end and the magnetic object can be modified during the handling of the utensil while the first end is not in contact with the reference surface, by translation of the magnetic object along the longitudinal axis $\Delta$ such that it has a value, referred to as the actual value, that is different from the recorded value. The method then includes the following steps:

determining a parameter $\kappa(t_n)$ representative of a contact between the first end and the reference surface belonging to a touch sensor, and when contact is detected by the touch detector:

determining a value of a first distance, referred to as the projected distance, which is equal to a distance between the position $P_A(t_n)$ of the magnetic object and a position $P_I(t_n)$ of a point of intersection I between the reference surface and a straight line collinear with the magnetic moment $\underline{m}(t_n)$, then determining the actual value of the first distance on the basis of the determined value of the first projected distance;

updating the recorded value of the first distance by replacing the previous recorded value with the actual determined value of the first distance.

Certain preferred but non-limiting aspects of this method are the following.

The value of the first projected distance can be determined on the basis of a norm $\|P_A P_I(t_n)\|$ of a first vector $P_A P_I(t_n)$ going from the position $P_A$ of the magnetic object to the position $P_I$ of the point of intersection I, this norm $\|P_A P_I(t_n)\|$ of the first vector $P_A P_I(t_n)$ being determined on the basis of a norm $\|\underline{m}\|$ of the magnetic moment $\underline{m}$, of the coordinate $m_z$ of the magnetic moment along a vertical axis orthogonal to the plane of the reference surface, and on the basis of a first distance $h_{A,z}$ along the vertical axis between the position $P_A$ of the magnetic object and the reference surface.

When the contact is detected, the position $P_I$ of the point of intersection I can be determined on the basis of the position $P_A$ of the magnetic object and on the basis of the first vector $P_A P_I(t_n)$, the latter being determined on the basis of the norm $\|P_A P_I(t_n)\|$ previously determined, of the magnetic moment $\underline{m}$ and of the norm $\|\underline{m}\|$ of the magnetic moment.

The first end may have a curved shape, and when contact is detected, the magnetic moment $\underline{m}$ may have a non-zero angle of inclination $\varphi$ relative to the vertical axis, so that the first end includes an end area located in the extension of the longitudinal axis $\Delta$, as well as a contact area, separate from the end area, at which the first end is in contact with the reference surface, an actual contact position $P_C$ is then determined on the basis of the position $P_A$ and of the magnetic moment $\underline{m}$ of the magnetic object, and on the basis of at least one pre-recorded geometric parameter representative of the curved shape of the first end.

The pre-recorded geometric parameter may be the center of a sphere of radius R, one surface of which is locally tangent to a surface of the first end (4) and passing through the position $P_P$ and the actual contact position $P_C$, the actual contact position $P_C$ can be determined on the basis of the magnetic moment $\underline{m}$ and of its norm $\|\underline{m}\|$ and on the basis of a distance $h'_{A,z}$ along the vertical axis between the position $P_A$ of the magnetic object and a plane parallel to the reference surface and passing through the center of the sphere.

The actual contact position $P_C$ of the first end can be displayed on a graphical interface.

The position $P_P$ of the first end, or a position of the first end determined by projecting the position $P_P$ onto the reference surface along an axis collinear with the magnetic moment $\underline{m}$ or along a vertical axis orthogonal to the reference surface, can be displayed on a graphical interface.

The position $P_P$ of the first end can be determined on the basis of the magnetic moment $\underline{m}$, of its norm $\|\underline{m}\|$, and of the recorded value of the first projected distance, or when no update of the first distance has yet occurred, of the pre-recorded value of said first distance.

The step of determining the first projected distance may not be when the magnetic moment $\underline{m}$ of the magnetic object has an angle of inclination φ greater than 60° relative to a vertical axis orthogonal to the plane of the reference surface.

The touch sensor may be inactive as long as the position $P_P$ of the first end is greater than a predefined threshold value $P_{P,th}$ along a vertical axis orthogonal to the plane of the reference surface, and may be electrically activated when the position $P_P$ is less than or equal to the threshold value $P_{P,th}$.

The touch sensor may be a matrix sensor including a matrix of discrete pixels securely fastened to the reference surface and suitable for providing an electrical response signal representative of a contact of the first end on the reference surface. The method may comprise determining at least one pixel, referred to as the closest pixel, that has a distance relative to the position $P_I$ less than or equal to a predefined threshold value, only the closest pixel being activated to detect the contact.

The utensil can comprise a second end opposite the first end along the longitudinal axis Δ, the magnetic object being separated from the second end along a longitudinal axis Δ by a second non-zero distance. The method may comprise a step of determining the orientation $+\underline{m}$ or $-\underline{m}$ of the magnetic moment $\underline{m}$ directed toward the first end.

The tracking method may further ensure the tracking of the second end of the utensil, the second distance between the second end and the magnetic object being able to be modified during handling. The method includes the following steps:

during the step of handling of the utensil by a user, the second end is alternately in contact and not in contact with a reference surface during the handling of the utensil while the second end is not in contact with the reference surface, the second distance is modified by translation of the magnetic object along the longitudinal axis Δ such that it has a second value, referred to as the actual value, that is different from a second recorded value;

determining the position $P_{P'}(t_n)$ of the second end of the utensil on the basis of the state vector $X_A(t_n)$, of the previously recorded value of the second distance between the second end and the magnetic object, and of the orientation of the magnetic moment $\underline{m}$ toward the second end;

determining a parameter $\kappa'(t_n)$ representative of a contact between the second end and the reference surface, and when contact is detected by the touch sensor:

determining a value of a second distance, referred to as the projected distance, which is equal to a distance between the position $P_A(t_n)$ of the magnetic object and a position $P_I(t_n)$ of a point of intersection I between the reference surface and a straight line collinear with the magnetic moment $\underline{m}(t_n)$, then;

determining the actual value of the second distance on the basis of the determined value of the second projected distance;

updating the recorded value of the second distance by replacing the previous recorded value with the actual determined value of the second distance.

The invention also relates to a system for tracking a first end of a utensil, including:

a utensil, intended to be handled by a user to cause the first end to be alternately in contact and not in contact with a reference surface;

a magnetic object being securely fastened to the utensil and separated from the first end along a longitudinal axis Δ of the utensil by a first non-zero distance that may vary during the handling of the utensil by a user by translation of the magnetic object along the longitudinal axis Δ such that it has a value, referred to as the actual value, that is different from a recorded value, the magnetic object having a magnetic moment $\underline{m}$ collinear with the longitudinal axis Δ;

a locating device, including:

an array of magnetometers, securely fastened to the reference surface, and suitable for measuring a magnetic field emitted by the magnetic object;

an electronic computing unit, including a recorded value of the first distance between the first end and the magnetic object, and being suitable for:

determining a state vector $X_A$ representative of a position $P_A$ and of the magnetic moment $\underline{m}$ of the magnetic object on the basis of the measured magnetic field;

determining a position $P_P$ of the first end on the basis of the state vector $X_A$ and of a recorded value of the first distance between the first end and the magnetic object;

when contact is detected between the first end and the reference surface by a touch sensor, determining a value of a first distance, referred to as the projected distance, which is equal to a distance between the position $P_A(t_n)$ of the magnetic object and a position $P_I(t_n)$ of a point of intersection I between the reference surface and a straight line collinear with the magnetic moment $\underline{m}(t_n)$, and then determining the actual value of the first distance on the basis of the determined value of the first projected distance; and updating the recorded value of the first distance by replacing the previous recorded value with the actual determined value of the first distance;

the touch sensor, including the reference surface, suitable for detecting contact between the first end and the reference surface, and for transmitting the contact information to the locating device.

BRIEF DESCRIPTION OF THE DRAWINGS

Other aspects, aims, advantages and features of the invention will become more apparent on reading the following detailed description of preferred embodiments thereof, given by way of non-limiting examples, and made with reference to the appended drawings, in which.

DETAILED DESCRIPTION OF PARTICULAR EMBODIMENTS

In the figures and in the rest of the description, the same references represent identical or similar elements. In addition, the different elements are not shown to scale so as to favor the clarity of the figures. Moreover, the different embodiments and variants are not exclusive of one another and can be combined with one another. Unless otherwise indicated, the terms "substantially", "about", "of the order of" mean to within 10%, and preferably to within 5%. Moreover, the terms "comprised between . . . and . . . " and equivalents mean that the limits are included, unless otherwise mentioned.

The invention relates to a system and a method for tracking a first end of a utensil, for example a tip, provided with a magnetic object intended to be handled by a user. It is suitable for:

determining a state vector $X_A$ representative of a position $P_A$ and of the orientation of the magnetic object in an OXYZ coordinate system;

determining the position $P_P$ of the tip of the utensil on the basis of the state vector $X_A$ and of a recorded value of the distance D between the magnetic object and the tip;

determining, when a contact of the tip on a reference surface is detected, the actual value of the distance between the magnetic object and the tip (referred to as the first distance and denoted $D_1$), and updating the recorded value of the distance $D_1$ on the basis of the actual determined value.

For this, the tracking system generally includes:

a utensil equipped with a magnetic object;

a locating device, including a memory containing a recorded value of the distance $D_1$ between the magnetic object and the tip, and suitable for determining the state vector $X_A$ representative of the position $P_A$ and the orientation of the magnetic object, and for determining a position $P_P$ of the tip of the utensil taking into account the recorded value of the distance $D_1$;

a touch sensor having a reference surface suitable for detecting contact of the tip on the reference surface;

a graphical interface, when it is sought to display the position of the tip or another position derived from the position of the tip, in particular during a non-contact phase.

The locating device is equipped with an array of magnetometers for measuring the ambient magnetic field, including the contribution generated by the magnetic object. Furthermore, the touch sensor is said to be a "touch" sensor insofar as it is suitable for detecting the contact of the tip of the utensil on the reference surface. It is then suitable for providing an electrical response signal representative of the possible contact of the tip of the utensil on the reference surface. The touch sensor may be of the capacitive or resistive type, for example piezoresistive. More broadly, the touch sensor has a parameter which varies depending on the contact of the tip on the reference surface, and optionally on the exerted bearing force. This parameter can be a capacitance, an electrical resistance, an electrical voltage, etc. The touch sensor may be a "matrix" sensor when it comprises a matrix of mutually discrete pixels formed by conductive tracks arranged in rows and columns. Each pixel is then suitable for providing a response signal.

The tracking system can find an application in the digitization of a drawing or a writing, which then consists of the reading and recording of a line traced by the tip of the utensil on the reference surface. Reading the line traced by the tip of the utensil means determining and recording the successive positions of the tip of the utensil when it is in contact with the reference surface. It can also find application, inter alia, in human-machine interfaces, for example for interacting with 2D or 3D digital objects displayed by the graphical interface.

As explained below, the method and the system for tracking the tip of the utensil are suitable, during a phase of contact of the tip on the reference surface, for determining the actual value $D_{1(k+1)}$ of the distance $D_1$ between the magnetic object and the tip of the utensil, along the longitudinal axis thereof, and for updating the recorded value of this distance $D_1$ in a computing unit by replacing the previous recorded value $D_{1(k)}$ with the actual determined value $D_{1(k+1)}$. These steps of determining the actual value $D_{1(k+1)}$ of the distance $D_1$ and updating the recorded value constitute a recalibration of the distance $D_1$ between the tip and the magnetic object.

In the context of the invention, the position of the magnetic object relative to the tip (and therefore the distance $D_1$) is modified when the utensil is handled, by translation of the magnetic object along the longitudinal axis Δ of the utensil, while the utensil and therefore the tip in question is not in contact with the reference surface. It is when the touch sensor detects contact of the tip on the reference surface that the recalibration of the distance $D_1$ is performed.

Figure 1:
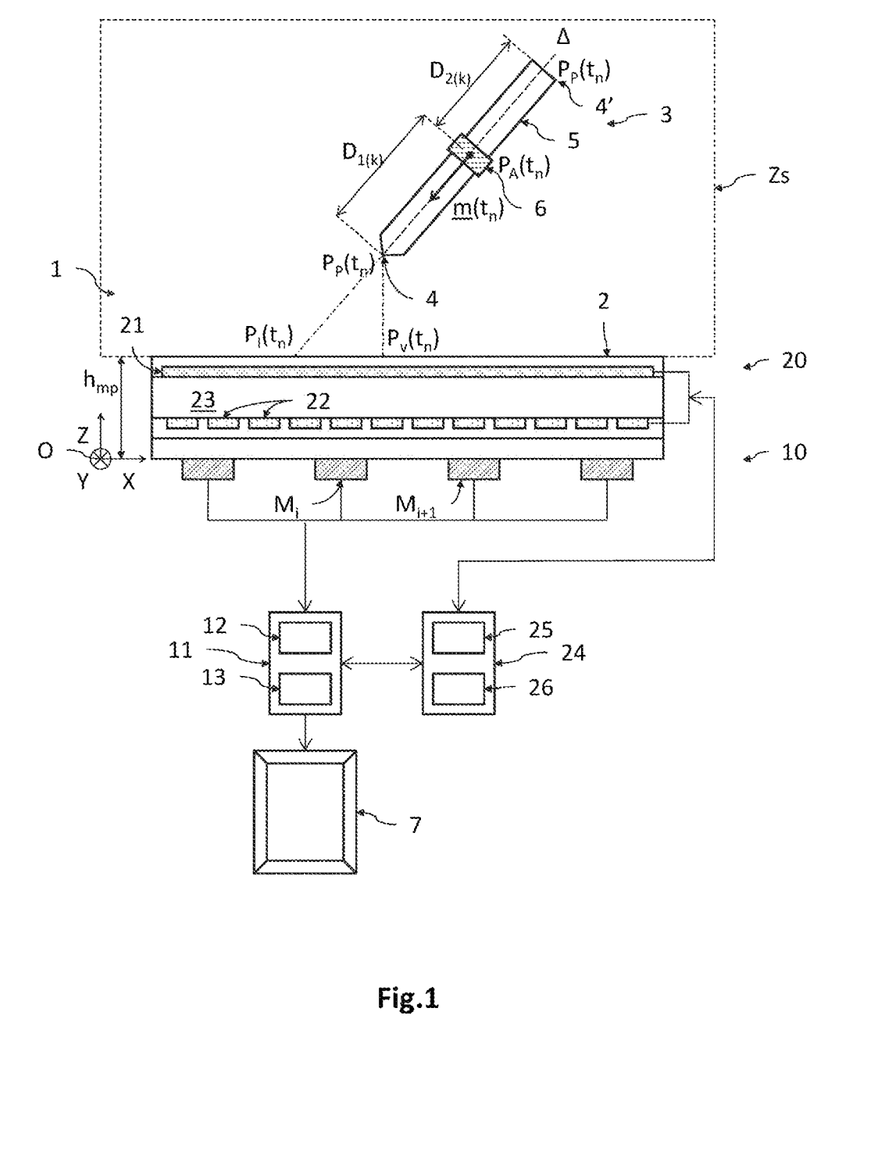
FIG. 1 is a schematic and partial sectional view of a system for tracking a tip of a utensil on a reference surface according to one embodiment.
Figure 2:
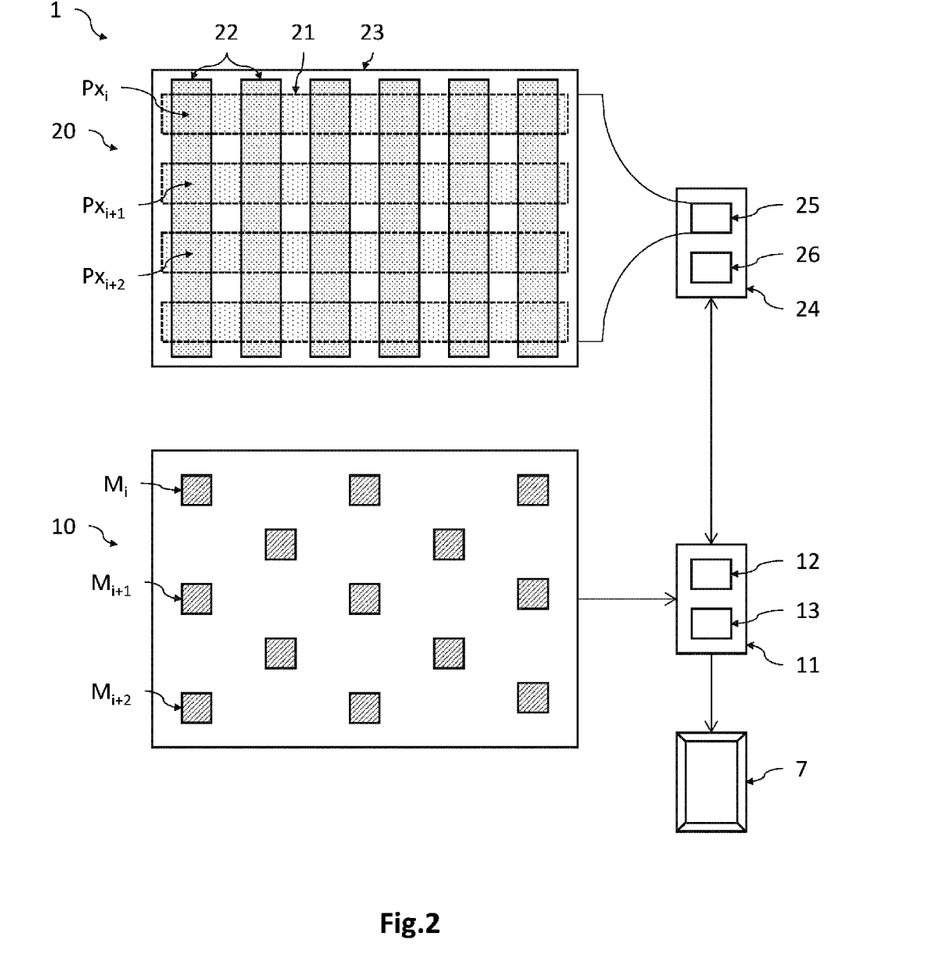
FIG. 2 is a schematic and partial exploded view of the tracking system shown in FIG. 1.

FIGS. 1 and 2 are schematic and partial views, sectional and exploded, respectively, of a system 1 for tracking a tip 4 of a utensil 3 according to one embodiment. In this example, the utensil 3 is a stylus, a first end 4 of which (herein a tip) is intended to come into contact with the reference surface 2. Furthermore, the touch sensor 20 is a resistive pressure matrix sensor, which is then suitable, in addition to detecting the contact of the tip 4 on the reference surface 2, for measuring the bearing force thereof (also referred to as the pressure force). However, as mentioned above, the touch sensor 20 may not be a matrix sensor.

The reference surface 2 may be the surface of a protective layer of the touch sensor 20 described in detail below. It may also be the surface of an added element arranged on a bearing surface of the touch sensor 20, this element being suitable for transmitting the pressure force exerted by the tip 4 of the stylus 3 to the touch sensor 20. Such an element may be, for example, one or several sheets of paper.

Herein, and for the rest of the description, an OXYZ orthogonal three-dimensional direct coordinate system is defined, wherein the axes X and Y form a plane parallel to the reference surface 2, and wherein the Z-axis is oriented toward the utensil 3. In this example, the origin O is located at the edge of a tracking area Zs of the magnetic object 6, and in a plane passing through the array of magnetometers, but it may be located elsewhere in the tracking area Zs, for example at the edge and in the plane of the reference surface 2.

The utensil 3 is an object intended to be handled by a user, for example by hand. It includes a rigid structure 5 (body) made of a preferably non-magnetic material, for example plastic, which has a tip 4 intended to come into contact with the reference surface 2 of the touch sensor 20. It may be a pencil in the broad sense, that is to say a pen, stylus, felt-tip pen, brush or any other writing or drawing element. The tip 4 is, generally speaking, an end of the utensil 3 along the longitudinal axis Δ, and can be pointed or rounded, rigid or deformable. The term "deformable" is used herein to mean slightly deformable so that, when the tip 4 comes into contact with the reference surface 2, the deformation of the tip 4 substantially does not modify the actual value of the distance D between the magnet 6 and the tip 4 along the longitudinal axis Δ. In other words, in the context of the invention, the modification of the value of the distance D is essentially due to the translation of the magnet 6 along the longitudinal axis Δ during the handling of the utensil 3 during a non-contact phase.

The rigid structure 5 of the stylus 3 extends along a longitudinal axis Δ. In other words, the rigid structure 5 includes a front part (the tip 4) intended to come into contact with the reference surface 2, and a rear part, these front and rear parts being opposite one another along this longitudinal axis Δ.

The magnetic object 6, herein a permanent magnet, is securely fastened to the rigid structure 5 of the stylus 3. The magnetic object 6 includes a material having a magnetization, for example remanent, for which a magnetic moment m is defined. It may be a cylindrical permanent magnet, for example annular, as illustrated in document WO 2014/053526, or even an electromagnet. It may also be a transponder suitable for re-emitting a magnetic field emitted by an array of magnetic generators. However, in this example, the magnetic object 6 is a permanent magnet.

The magnetic material is preferably ferrimagnetic or ferromagnetic. It has a non-zero spontaneous magnetic moment even in the absence of an external magnetic field. It may have a coercive magnetic field greater than $100\,A\cdot m^{-1}$ or $500\,A\cdot m^{-1}$ and the intensity of the magnetic moment is preferably greater than $0.01\,A\cdot m^2$ or even $0.1\,A\cdot m^2$, for example equal to about $0.2\,A\cdot m^2$. It is considered that the magnetic object 6 can be approximated by a magnetic dipole, but other models can be used. The magnetic axis of the magnetic object 6 is defined as being the axis collinear with the magnetic moment $\underline{m}$ of the magnetic object 6. The magnetic moment $\underline{m}$ herein is collinear with the longitudinal axis Δ of the stylus 3.

The magnet 6 is securely fastened to the rigid structure 5 in the sense that it can only move by translating along the longitudinal axis Δ, but it is still possible for the magnet 6 to be translated by the user during the handling of the utensil 3 while the latter (and therefore the tip 4) is not in contact with the reference surface 2. In this case, the actual value of the distance $D_1$ between the magnet 6 and the tip 4 along the longitudinal axis Δ is then modified with respect to an initial value $D_{1(k=0)}$ pre-recorded in the computing unit 11 of the tracking system 1. This distance $D_1$ is defined as being the length along the longitudinal axis Δ between the barycentric center of the magnet 6 and the tip 4 of the stylus 3. This is why the tracking method provides a phase of recalibrating the distance $D_1$.

The magnet 6 is initially disposed at a non-zero distance $D_{1\ (k=0)}$ from the tip 4 of the stylus 3. This initial value $D_{1\ (k=0)}$ is known and recorded in the memory 13 of the computing unit 11 of the locating device 10, with a digital model representative of the utensil 3 used. Also, knowledge of the position $P_A$ and the orientation of the magnet 6 in the OXYZ coordinate system and knowledge of the recorded value $D_{1(k=0)}$ of the distance $D_1$ make it possible to deduce therefrom the position $P_p$ of the tip 4 of the stylus 3.

However, insofar as the value of this distance $D_1$ may vary over time when the utensil 3 is handled by the user during the non-contact phases and therefore have an actual value different from the initial value $D_{1(k=0)}$, the tracking method includes determining the actual value $D_{1(k+1)}$, and updating the distance $D_1$ in the computing unit 11 by replacing the previous recorded value $D_{1(k)}$ with the actual determined value $D_{1(k+1)}$. The position $P_P$ of the tip 4 is subsequently determined on the basis of the recorded value $D_{1(k+1)}$ which is then updated. The indicator k is incremented by one unit with each new phase of contact of the tip 4 on the reference surface 2.

The tracking system 1 also includes a locating device 10, suitable for locating the magnet 6, that is to say for determining a state vector $X_A$ representative of the position $P_A$ and the orientation of the magnet 6 in the OXYZ coordinate system, then for determining the position $P_P$ of the tip 4 in this same coordinate system on the basis of the state vector $X_A$ and of the recorded value of the distance D from the magnet 6 to the tip 4. It is also suitable for determining, during a contact phase detected by the touch sensor 20, the actual value $D_{1(k+1)}$ of the distance $D_1$ between the magnet 6 and the tip 4 and for updating the recorded value on the basis of the actual determined value $D_{1(k+1)}$.

The position $P_P$ in the OXYZ coordinate system or a position $P_I$ or $P_V$ can then be displayed on the graphical interface 7, especially during the non-contact phases. The position $P_I$ is that of the point of intersection between the reference surface 2 and a straight line collinear with the magnetic moment of the magnet 6 and therefore passing through the tip 4. The position $P_V$ is the projection onto the reference surface 2, along the Z-axis, of the position $P_P$. The position $P_P$ can be displayed for example in the case of a three-dimensional representation of a virtual space containing digital objects to be handled (human-machine interface). The position $P_V$ and/or the position $P_I$ can be displayed for example in the case of a displaying of a cursor on a two-dimensional representation of the reference surface 2 in the context of reading the traced line.

Locating the magnet 6 means determining the position $P_A$ And the orientation of the magnet 6 in the tracking area Zs in the form of a state vector $X_A$. The position $P_A$ of the magnet 6 herein corresponds to the coordinates of the geometric center of the magnet 6, that is to say to the non-weighted barycenter of all the points of the magnet 6. Furthermore, the magnetic moment $\underline{m}$ of the magnet 6 is a vector whose components are ($m_x$, $m_y$, $m_z$) in the OXYZ real coordinate system. Its norm, also referred to as intensity or amplitude, is denoted $\|\underline{m}\|$ or m. It is collinear with the longitudinal axis Δ and therefore passes through the tip 4 of the stylus 3.

The magnet 6 is intended to move within the tracking area Zs. This is a space in which the signal-to-noise ratio (SNR)

of at least one of the magnetometers of the locating device 10 is greater than or equal to a predefined threshold value. By way of example, the tracking area Zs may be a space in which the signal, that is to say the norm or at least one component of the magnetic field generated by the magnet 6 and measured by the corresponding magnetometer, is greater than or equal to, for example, 20 times the noise. The noise associated with each magnetometer may be equal to about 0.2 µT. In this case, the tracking area Zs corresponds to an area of the space in which the magnetic field generated by the magnet 6 and measured by at least one of the magnetometers $M_i$ is greater than or equal to about 6 µT, which corresponds to a distance $d_{max}$ equal to about 20 cm along the directing axis passing through the magnetometer $M_i$ in question. More simply, the tracking area Zs may be defined as a space in which each point is at a distance less than or equal to a maximum distance $d_{max}$ along the directing axis passing through the closest magnetometer $M_i$, for example, said distance being equal to 20 cm, or 10 cm, or even 5 cm.

The locating device 10 is able to measure the ambient magnetic field, one of the contributions of which is the magnetic field generated by the magnet 6, at different measurement instants, during a tracking period T, in the OXYZ coordinate system, and then to estimate the position $P_A$ and the orientation of the magnet 6 based on the measurements of the magnetometers $M_i$, and finally to determine the position $P_P$ of the tip 4 of the magnet 6 in the OXYZ coordinate system.

For this, it includes an array of magnetometers $M_i$, herein securely fastened with no degrees of freedom to a rear face of the touch sensor 20. The number of magnetometers $M_i$ may be, for example, greater than or equal to 2, preferably greater than or equal to 16, for example, equal to about 25, especially when they are triaxial magnetometers. The array of magnetometers $M_i$, however, includes at least three measurement axes distant from each other and not parallel two by two. The magnetometers $M_i$ can be aligned in rows and columns, or may be positioned mutually randomly. The positions of the magnetometers $M_i$ are known. For example, they may be comprised between 1 cm and 10 cm, for example 5 cm.

The magnetometers $M_i$ each have at least one measurement axis, for example three axes, denoted $x_i$, $y_i$ and $z_i$. Each magnetometer therefore measures the amplitude and direction of the ambient magnetic field $B_i$, one contribution of which is generated by the magnet 6. More precisely, each magnetometer $M_i$ measures the norm of the orthogonal projection of the ambient magnetic field $B_i$ along the axes $x_i$, $y_i$, $z_i$ of the magnetometer. A calibration parameter for the magnetometers $M_i$ may be the noise associated with the magnetometers, herein of the order of 0.2 µT. The term "ambient magnetic field B" is understood to mean the magnetic field not disturbed by any magnetic element, formed especially by a terrestrial contribution $B^{terr}$ of the order of 50 µT, to which the magnetic field $B^a$ generated by the magnet 6 is added. Other magnetic contributions may be added, such as a contribution associated with the noise of the sensors and a contribution related to an offset error, which are ignored herein.

The locating device 10 further includes a computing unit 11 able to:
determine the state vector $X_A$ (position $P_A$ and orientation of the magnet 6 in the OXYZ coordinate system), on the basis of the measurements of the magnetometers $M_i$;
determine the position $P_P$ of the tip 4 of the stylus 3 in the OXYZ coordinate system, on the basis of the state vector $X_A$ and the recorded distance D between the magnet 6 and the tip 4;
determine, when the contact of the tip 4 on the reference surface 2 has been detected by the touch sensor 20, the actual value $D_{1(k+1)}$ of the distance $D_1$ between the magnet 6 and the tip 4, and to update the recorded value of this distance $D_1$.

For this, each magnetometer $M_i$ is electrically connected to the computing unit 11 by an information transmission bus (not shown). The computing unit 11 includes a programmable processor 12 able to execute instructions recorded on an information recording medium. It further includes a memory 13 containing the instructions necessary for locating the magnet 6, as well as the digital model of the utensil 3 used, making it possible to provide the position $P_P$ of the tip 4 of the stylus 3 in the OXYZ coordinate system on the basis of the state vector $X_A$. It therefore contains an initial value $D_{1(k=0)}$ of the distance D1 between the magnet 6 and the tip 4, this value then being updated with each new contact phase and recorded in the computing unit 11 (it is then denoted $D_{1(k+1)}$). Preferably, the initial value $D_{1(k=0)}$ is small relative to the length of the stylus 3, so that the magnet 6 is initially positioned near the tip 4. It can thus be substantially equal to the half-length of the magnet 6. The memory 13 is also suitable for storing the information calculated at each measurement instant. The computing unit 11 is connected to the graphical interface 7 to display the position $P_P$ or a projected position $P_I$ or $P_V$.

The computing unit 11 implements a mathematical model associating the position of the magnet 6 in the OXYZ coordinate system, as well as the orientation and intensity of its magnetic moment $\underline{m}$, with the measurements of the magnetometers $M_i$. This mathematical model is constructed on the basis of electromagnetism equations, in particular magnetostatic equations, and is parameterized especially by the positions and orientations of the magnetometers in the OXYZ coordinate system. Here, this model is nonlinear. The computing unit 11 implements an algorithm for estimating its solution such as, for example, Bayesian filtering (e.g. extended Kalman filter) or optimization, or even any other algorithm of the same type.

Preferably, to be able to approximate the magnet 6 to a magnetic dipole, the distance between the magnet 6 and each magnetometer $M_i$ is greater than 2, or even 3 times the largest dimension of the magnet 6. This dimension may be less than 20 cm, or even less than 10 cm, or even 5 cm. The magnet 6 can be modeled by a dipolar model, inter alia, depending especially on the distance between the magnet 6 and each magnetometer $M_i$ of the array.

The tracking system 1 includes a touch sensor 20, herein a pressure matrix sensor. It is suitable for detecting the contact of the tip 4 of the stylus 3 on the reference surface 2, herein on the basis of the measurement of the intensity of the pressure force exerted on this reference surface 2, and for transmitting this information to the locating device 10. Thus, on the basis of this information, the tracking system 1 determines whether the handling of the stylus 3 is in a phase where the tip 4 contacts the reference surface 2 or is in a non-contact phase.

The touch sensor 20 herein includes a pressure matrix, formed of a plurality of pixels $P_{Xi}$ sensitive to the pressure exerted on the surface thereof. In this example, the pressure matrix is resistive. Such a sensor is also referred to as force-sensing resistor.

It is formed of a film 23 made of a piezoresistive material, that is to say of a material whose local electrical resistance varies according to the mechanical stress exerted, for example, made of a conductive polymer. The sensitive material of the film may be continuous in the plane XY or may be pixelated. Conductive tracks 21, 22 are formed in rows on one face of the film and in columns on the opposite face. The pixels $P_{Xi}$ are formed by the intersection, viewed from above, between the rows and the columns of the conductive tracks. The pixels $P_{Xi}$ can adjoin one another, or even be spaced apart from one another (as illustrated in FIG. 2).

The touch sensor 20 herein includes a number N of pixels $P_{Xi}$, for example equal to about 2500. The conductive tracks 21, 22 may have a width of a few millimeters, for example 2.5 mm, such that a pixel herein has a surface area of 2.5×2.5 mm². The pixels $P_{Xi}$ are discrete and are spaced apart in the plane XY from one another, for example by a distance of about 1 mm. The diameter of the tip 4 of the stylus 3 in contact with the reference surface 2 may herein be of the order of a millimeter, for example comprised between about 1 mm and 3 mm.

The touch sensor 20 includes a processing unit 24, including, for example, a microcontroller 25 ensuring the control and reading of the different pixels of the pressure matrix, and a computer 26 suitable for detecting the contact of the tip 4 on the basis of the electrical response signals emitted by the pixels. The microcontroller is thus suitable for transmitting an electrical control signal to each of the pixels, and for receiving an electrical response signal, the latter being representative of an optional contact of the tip 4 of the stylus 3 on the reference surface 2. The processing unit includes the coordinates of the N pixels $P_{Xi}$ in the OXYZ coordinate system.

The computer 26, on the basis of at least one electrical response signal, detects whether or not the tip 4 is in contact with the reference surface 2. For this, the intensity of the electrical signal emitted by each queried pixel or, for example, a combination of the intensity of the electrical signal coming from each of the queried pixels, has a value which, when it is greater than a predetermined threshold, corresponds to contact of the tip 4 on the reference surface 2. The intensity of the pressure force exerted by the tip 4 depends on the intensity of the electrical signals emitted by one or several pixels.

In the case of reading the traced line, the computing unit 11 of the locating device 10 then records the successive positions $P_P(t_n)$ of the tip 4 in contact with the reference surface 2, determined by the locating device 10, when the contact has been detected by the touch sensor 20, which thus form or participate in forming part of the traced line of the utensil 3 on the reference surface 2. All of the "raised" parts, taking into account discontinuities (non-contact phases), form the line traced by the stylus on the reference surface. The position $P_P$ then coincides substantially with the projected positions $P_I$ and $P_V$. The intensity of the pressure force exerted (when it is greater than the threshold contact detection value) makes it possible to provide an additional characteristic of the line traced by the utensil 3, and can be used to vary, for example, the width of the line traced by of the utensil 3.

The processing unit 24 can thus comprise a microcontroller 25 for controlling the electrical supply of the pixels, associated with analog-to-digital converters ADC, and its computer 26 includes at least one processor and at least one memory containing the instructions necessary for implementing the detection of the contact of the tip 4 and the measurement of the pressure force, and to store the information calculated at each measurement instant, and herein converters. Of course, the processor and the memory of the computer 26 can be conflated or not with those of the microcontroller 25, and/or with those of the locating device 10.

As detailed below, the stylus 3 is intended to be handled by the user in a tracking area Zs. At each measurement instant, the position $P_P$ of the tip 4 of the stylus 3 can be represented on the graphical interface 7. This handling includes the alternation of non-contact phases and phases of contact of the tip 4 on the reference surface 2:

during a first non-contact phase, the tip 4 of the stylus 3 is not in contact with the reference surface 2. The position $P_P$ of the tip 4 is then determined by the locating device 10 on the basis of the state vector $X_A$ (position $P_A$ and orientation) of the magnet 6, and on the basis of the initial value $D_{1(k=0)}$ of the distance $D_1$ between the magnet 6 and the tip 4 pre-recorded in the computing unit 11 of the locating device 10. The position $P_P$ of the tip 4 in the OXYZ coordinate system or a projected position $P_I$ or $P_V$ on the reference surface 2 can be represented in real time on the graphical interface 7;

during a first contact phase, the user brings the tip 4 of the stylus 3 into contact with the reference surface 2. The touch sensor 20 then detects the contact, and the indicator k is incremented by one unit: k+1. The actual value $D_{1(k+1)}$ of the distance $D_1$ is then determined and the recorded value of the distance $D_1$ is then updated. The position $P_P$ of the tip 4 is determined on the basis of the state vector $X_A$ at the current instant and on the basis of the updated value $D_{k+1}$ of the distance $D_1$ between the magnet 6 and the tip 4;

during a non-contact phase that follows the first contact phase, the position $P_P$ of the tip 4 is then determined on the basis of the state vector $X_A$ at the current instant and on the basis of the already updated value $D_{1(k+1)}$ of the distance $D_1$ between the magnet 6 and the tip 4.

The increment k increases by one unit with each new contact phase. A contact phase is defined as being the period including one or several consecutive measurement instants during which the tip 4 of the stylus 3 is in continuous contact with the reference surface 2. The tracking system 1 can thus detect the initial instant of the first contact of the tip 4 on the reference surface 2 defining the start of a contact phase, as well as the final instant corresponding to the breaking of contact and defining the end of the contact phase.

Thus, the tracking system 1, by the combination of the locating device 10 and the touch sensor 20, makes it possible to take advantage of the contact of the tip 4 on the reference surface 2 to determine the actual value $D_{1(k+1)}$ of the distance $D_1$ between the magnet 6 and the tip 4, and update the recorded value of this distance $D_1$ by replacing the recorded value ($D_{1(k)}$) prior to the actual determined value ($D_{1(k+1)}$). Thus, during each non-contact phase following a contact phase, the position $P_P$ of the tip 4 is determined by taking into account the recorded actual value $D_{1(k+1)}$ of the distance $D_1$ between the magnet 6 and the tip 4 which has been determined during the previous contact phase. Errors in determining the position of the tip 4, related to an unintentional movement of the magnet 6 by the user, are thus limited. The precision of locating the position $P_P$ of the tip 4 of the magnet 6 is thereby improved.

Furthermore, the contact of the tip 4 is detected accurately by the touch sensor 20, and the position of the tip 4 is determined with a high resolution by the locating device 10.

The position of the tip 4 is thus not impacted by the potentially low resolution of conventional touch sensors, especially matrix sensors whose resolution depends on the dimensions and arrangement of the conductive tracks. In addition, the determining of a projected position $P_I$ or $P_V$ on the writing surface, if applicable, is not disrupted by any unwanted contacts, such as contact of the finger or palm of the user's hand on the reference surface 2.

Furthermore, the tracking system 1 may have a particularly low latency related to the control/reading of the matrix of pixels, insofar as only the pixel(s) closest to the projected position $P_I$ or $P_V$ can be activated by the microcontroller, and not all the pixels of the matrix. The control/reading frequency may then be particularly high. Consequently, the electrical consumption of the tracking system 1 is reduced. In addition, it is advantageous for the touch sensor 20 to remain at least in part inactive during the tracking of the magnetic object 6 by the locating device 10, especially when the position $P_P$ of the tip 4 along the Z-axis is greater than a threshold value $P_{P,th}$.

Furthermore, it is possible to use a touch sensor 20 the microcontroller and electrical connections of which are simple and conventional. This avoids having to use a microcontroller and particular connections linked to the need to activate the rows and/or columns in a manner that is either individual and sequential, or collective.

Figure 3:
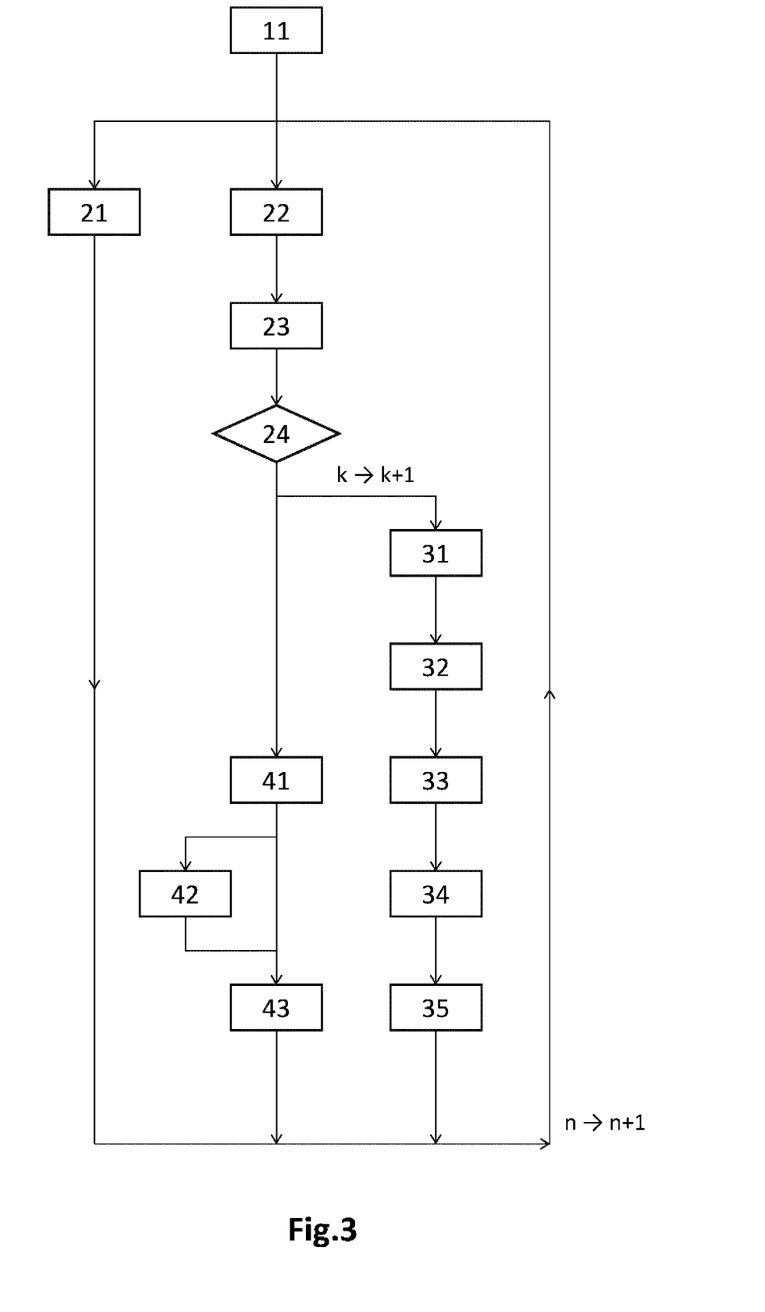
FIG. 3 is a flowchart showing steps of a method for tracking the tip of a utensil according to one embodiment.

FIG. 3 is a flowchart illustrating a method for tracking the utensil 3 according to one embodiment. In this example, the tracking system 1 is identical to that described with reference to FIGS. 1 and 2. In this example, the touch sensor 20 is activated regardless of the height of the tip 4 relative to the reference surface 2, and the set of pixels is queried. As described below, as a variant, the touch sensor 20 can be activated only when the position $P_P$ of the tip 4 along the Z-axis is less than a threshold value, and only the one or more pixels closest to a projected position $P_I$ or $P_V$ on the reference surface 2 can be activated to detect the contact.

During a first step 11, a digital model of the stylus 3 is recorded in the memory of the computing unit 11 of the locating device 10. This digital model comprises the initial value $D_{1(k=0)}$ of the distance $D_1$ between the magnet 6 and the tip 4. This recorded value is intended to be updated during each phase of contact of the tip 4 on the reference surface 2. It makes it possible to determine, before the first contact phase, the position $P_P$ of the tip 4 of the stylus 3 in the OXYZ coordinate system on the basis of the state vector $X_A$ of the magnet 6. This step also includes recording the coordinates of the reference surface 2 in the OXYZ coordinate system, and recording the coordinates of the pixels of the touch sensor 20.

During a step 21, the user handles the stylus 3 in the tracking area Zs, that is to say that they modify its position and optionally its orientation in the OXYZ coordinate system. When the stylus 3 is handled, there is herein an alternation of contact and non-contact phases of the tip 4 on the reference surface 2. During a non-contact phase, the magnet 6 is moved (for example unintentionally by the user) by translation along the longitudinal axis Δ so that the actual value of the distance $D_1$ is different from the recorded value $D_{1(k=0)}$.

The following steps 22 to 43 are performed iteratively at a measurement time $t_n$, the time being discretized at a determined sampling frequency, for example 140 Hz. Each iteration of rank n is associated with a measurement instant $t_n$, also referred to as the current instant. Furthermore, during each new contact phase, the indicator k is incremented by one unit.

During a step 22, the magnetometers measure the ambient magnetic field at the current instant $t_n$, and especially the contribution of the ambient magnetic field generated by the magnet 6 securely fastened to the stylus 3.

During a step 23, the computing unit 11 receives the measurements from the ambient magnetic field, deduces therefrom the contribution of the magnetic field generated by the magnet 6, and determines the state vector $X_A(t_n)$ associated with the magnet 6 at the current instant $t_n$ in the OXYZ coordinate system. The state vector $X_A(t_n)$ includes the position and orientation of the magnet 6 in the OXYZ coordinate system. This estimation of the state vector $X_A$ can be carried out using a Bayesian algorithm for estimating the position and orientation of the magnet 6, for example an extended Kalman filter, or using an optimization method (gradient descent, etc.), or using any other algorithm of the same type. One example of estimating a state vector associated with a magnet 6 is especially described in application WO 2018/219891.

Furthermore, for the rest of the tracking method, an orientation +m or m is assigned to the tip 4. In other words, it is determined which orientation +m or −m is directed toward the tip 4. For this, by way of example, the user can indicate that they wish to track and use the tip 4 of the stylus 3, the stylus 3 then being able to be held by the user so that the tip 4 is oriented toward the reference surface 2. The computing unit 11 then determines whether the magnetic moment m is oriented toward the tip 4 or toward the opposite end 4', and assigns this orientation (+m or −m) to the tip 4. Thus, by knowing the orientation +m or −m of the magnetic moment m with respect to the tip 4, it is known whether the end of the stylus 3 in contact with the reference surface is the tip 4 or the opposite end 4'. In the remainder of the description, the orientation +m of the magnetic moment is considered to be directed toward the tip 4.

During a step 24, the touch sensor 20 determines whether or not the tip 4 is in contact with the reference surface 2. In this example, the entire pixel matrix is then activated. To do this, the processing unit determines the value of a parameter $\kappa(t_n)$ representative of the contact of the tip 4 on the reference surface 2. Herein, this parameter is the intensity of the electrical response signal of the pixels. It may be the electrical resistance of the pixels, or any other equivalent parameter (average intensity or average resistance of a set of pixels, etc.). The processing unit compares the value of the parameter $\kappa(t_n)$ to a predefined threshold value $\kappa_{th}$ and detects the contact of the tip 4 on the reference surface 2 as being carried out when the value of the parameter $\kappa(t_n)$ is greater than or equal to the threshold value $\kappa_{th}$. The threshold value $\kappa_{th}$ makes it possible to filter fluctuations related to measurement noise. When contact is detected, the tracking method goes to step 31, and when this is not the case, it continues with step 41.

During step 31, when contact is detected by the touch sensor 20, the locating device 10 determines the actual value $D_{1(k+1)}$ of the distance $D_1$ between the magnet 6 and the tip 4. For this, the touch sensor 20 has therefore detected a contact of the tip 4 on the reference surface 2. A contact phase therefore takes place and this information is transmitted to the locating device 10. The computing unit 11 then increments the indicator k by one unit: k+1. Herein, this indicator keeps the same value as long as the same contact phase continues.

To determine the actual value $D_{1(k+1)}$ of the distance $D_1$, the computing unit 11 determines a value $D_{1I(k+1)}$ of the distance, referred to as the projected distance $D_{1I}$, separating the position $P_A$ of the magnet 6 and the position $P_I$ of the point I, the point I being defined as the point of intersection between the reference surface 2 and the straight line parallel to the magnetic moment $\underline{m}$ and therefore passing through the tip 4. The coordinates of the reference surface 2 were recorded in the memory of the computing unit 11 during step 11. Furthermore, it is considered that the vector $\underline{OP_I}$ going from point O to point $P_I$ is the vector sum of the vector $\underline{OP_A}$ going from point O to point $P_A$ (center of magnet 6) and the vector $\underline{P_A P_I}$. From the determined value $D_{1I(k+1)}$ of the projected distance $D_{1I}$, the actual value $D_{1(k+1)}$ of the distance $D_1$ is determined, and the value recorded in the computing unit is updated.

Figure 4A:
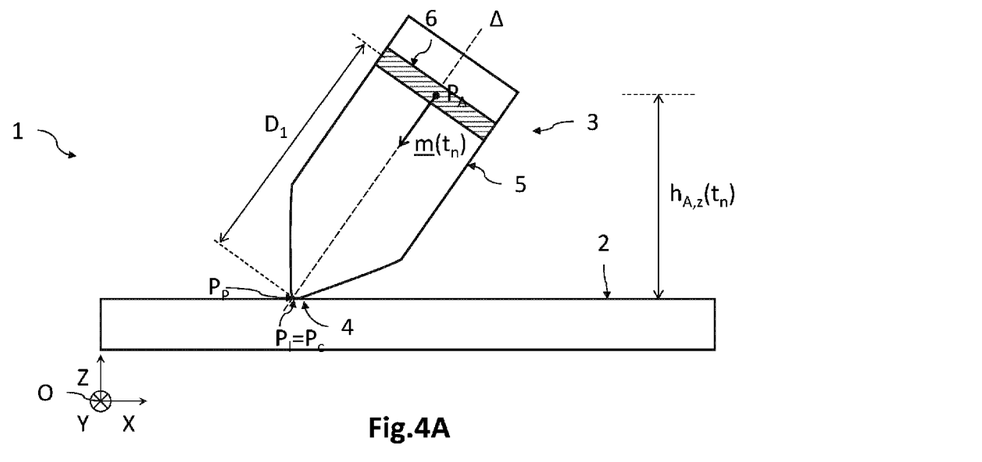
FIG. 4A is a schematic and partial sectional view of a tracking system shown in FIG. 5 during a contact phase, wherein the tip of the utensil is not rounded.
Figure 4B:
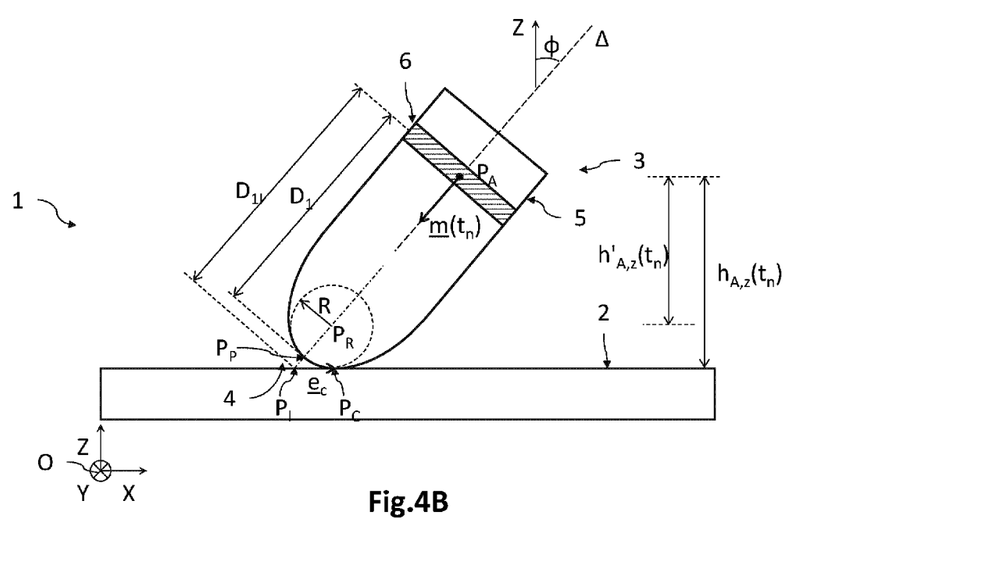
FIG. 4B is a schematic and partial sectional view of a tracking system according to another alternative embodiment, during a contact phase, wherein the tip of the utensil is rounded.

Two situations may occur during a contact phase, which depend on the shape of the tip 4. A first situation is illustrated in FIG. 4A and corresponds to the case where the tip 4 has a non-curved shape in the sense that the position $P_P$ of the end of the tip 4, the position $P_I$ of the point I, and the contact position $P_c$ coincide during contact. It should be noted that the tip 4 may actually have a certain curvature, but one which is sufficiently small relative to the thickness of the line shown so that the three positions are considered to coincide. A second situation is illustrated in FIG. 4B and corresponds to the case where the tip 4 has a curved shape in the sense that the position $P_P$ of the end of the tip 4, the position $P_I$ of the point I, and the contact position $P_c$ do not coincide during contact.

In the case of the first situation (FIG. 4A), the actual value $D_{1(k+1)}$ of the distance $D_1$ is equal to the value of the projected distance $D_{1I}$. It is possible to write the following in a general manner: $\|\underline{P_A P_I}(t_n)\| = h_{A,z}(t_n) \times \|\underline{m}\|/m_z(t_n)$, to within the absolute value. In other words, at the current instant $t_n$, the distance $\|\underline{P_A P_I}\|$ is equal to the height $h_{A,z}$ of the position $P_A$ of the magnet 6 relative to the reference surface 2 along the Z-axis, multiplied by the norm $\|\underline{m}\|$ of the magnetic moment $\underline{m}$ divided by the coordinate $m_z$ of the magnetic moment $\underline{m}$ along the Z-axis. However, during a contact phase, the actual value $D_{1(k+1)}(t_n)$ of the distance $D_1$ (just like the value $D_{1I(k+1)}$ of the projected distance $D_{1I}$) is equal to $\|\underline{P_A P_I}(t_n)\|$: $D_{k+1}(t_n) = \|\underline{P_A P_I}(t_n)\|$.

It is assumed herein that the value of $m_z$ is different from zero or greater than a predefined threshold. If this is not the case, these steps may not be carried out. It is thus possible not to determine and update the distance $D_1$ when the magnetic moment has an angle of inclination $\varphi$ greater than 60° relative to the Z-axis. The errors when determining the distance $D_1$ are thus limited. In addition, as mentioned above, it is considered herein that the orientation $+\underline{m}$ of the magnetic moment $\underline{m}$ is directed toward the tip 4.

Thus, the computing unit 11 determines $h_{A,z}(t_n)$ on the basis of the position $P_A$ of the magnet 6 in the OXYZ coordinate system previously determined during step 23 (determining the state vector $X_A(t_n)$), and on the basis of the coordinates in the OXYZ coordinate system of the reference surface 2. It also determines the norm $\|\underline{m}\|$ of the magnetic momentum $\underline{m}$. It therefore calculates the distance $\|\underline{P_A P_I}(t_n)\|$, that is to say the value $D_{1I(k+1)}(t_n)$ of the distance $D_{1I}$, and thus the actual value $D_{1(k+1)}(t_n)$ of the distance $D_1$ between the magnet 6 and the tip 4.

During a step 32, the computing unit 11 updates the recorded value of the distance $D_1$ between the magnet 6 and the tip 4 in the memory 13 by replacing the value $D_{1(k)}$ with the actual value $D_{1(k+1)}$. This recorded value can thus be an instantaneous value (e.g. the most recent one) or be an average value of the different values of the distance $D_{k+1}$ determined in the same contact phase. Other approaches are possible: it is possible, for example, to calculate the average by weighting the different determined values of $D_{1(k+1)}$ depending on the inclination of the stylus 3. Thus, greater weight may be assigned to the determined values of $D_{1(k+1)}$ when the stylus 3 forms an angle substantially orthogonal to the reference surface 2.

During step 33, the computing unit 11 determines the position $P_P(t_n)$ of the tip 4 on the reference surface 2 at the current instant, on the basis of the state vector $X_A(t_n)$ determined beforehand, and on the basis of the distance $D_{1(k+1)}$ updated from the distance $D_1$. To do this, the computing unit 11 determines the vector $\underline{P_A P_I}(t_n)$ on the basis of the updated distance $D_{1(k+1)}$ and on the basis of the magnetic moment $m(t_n)$: $\underline{P_A P_I}(t_n) = D_{1(k+1)} \times m(t_n)/\|\underline{m}\|$. As mentioned above, it is considered herein that the orientation $+\underline{m}$ of the magnetic moment $\underline{m}$ is directed toward the tip 4. Next, the position $P_P(t_n)$ of the tip 4 in contact with the reference surface 2 is determined on the basis of the vector $\underline{P_A P_I}(t_n)$ and the vector $\underline{OP_A}(t_n)$: $\underline{OP_P}(t_n) = \underline{OP_I}(t_n) = \underline{OP_A}(t_n) + \underline{P_A P_I}(t_n)$.

During step 34, the computing unit 11 records the position $P_P(t_n)$. In the case of an application to reading the traced line, the successive positions $P_P(t_n)$ recorded by the computing unit 11 during the contact phase form or participate in forming the traced line made by the stylus 3 on the reference surface 2.

Alternatively, the position $P_P$ of the tip 4 in contact with the reference surface 2, as recorded by the computing unit 11, can depend both on the position determined by the locating device 10 (the position $P_P$), and a determined position $P_{P,cp}$ provided by the touch sensor 20. Thus, the position $P_{P,cp}(t_n)$ may correspond to the position of the centroid (weighted barycenter) of the pressure forces exerted by the tip 4 on the reference surface 2, and measured by the pixels queried. The position of the tip 4 in contact with the reference surface 2 recorded by the computing unit 11 can be the average, weighted or not as a function of the magnetic disruption, of the position $P_P$ determined by the locating device 10 and the position $P_{P,cp}$ determined by the touch sensor 20.

During a step 35, the computing unit 11 controls the graphical interface 7 to display the position $P_P(t_n)$ of the tip 4 (and, where appropriate, of the traced line).

Furthermore, when the contact of the tip 4 on the reference surface 2 is not detected, steps 41 to 43 are carried out.

During step 41, the locating device 10 determines the position $P_P(t_n)$ on the basis of the state vector $X_A(t_n)$ determined in step 23 and on the basis of the recorded value $D_{1(k)}$ of the distance $D_1$ between the magnet 6 and the tip 4. The distance $D_{1(k)}$ is the initial value $D_{1(k=0)}$ when there has previously been no contact phase, or is the value $D_{1(k)}$ determined and updated during the last contact phase. The position $P_P(t_n)$ can be determined as follows: $\underline{OP_P}(t_n) = \underline{OP_A}(t_n) + D_{1(k)} \times m(t_n)/\|\underline{m}\|$.

During step 42, the locating device 10 determines, if necessary, the projected position $P_P(t_n)$ which is the projection of the position $P_P(t_n)$ of the tip 4 on the reference surface 2 along the Z-axis. This position $P_P(t_n)$ can correspond to the position of a cursor displayed on the graphical interface 7 in the case especially of a reading of the traced line. It is alternatively possible to choose to determine the position $P_I(t_n)$.

During step 43, the locating device 10 controls the graphical interface 7 to display the position $P_P(t_n)$ in the case especially of an application of the human-machine interaction type and a three-dimensional representation of the stylus 3 or equivalent, or to display the position $P_P(t_n)$ or the position $P_I(t_n)$ in the case especially of an application for reading the traced line (or even the projected position $P_I$).

Steps 22 to 43 are repeated at the defined sampling frequency, which may be constant over time or not, and which may in particular depend on the speed of movement of the magnet 6 or the tip 4, calculated by the locating device 10 on the basis of the state vector $X_A(t_n)$. In particular, the sampling frequency associated with the location of the magnet 6 (e.g. 140 Hz) may be identical to or different from the control/reading frequency of the pixels of the touch sensor 20.

Thus, the tracking method makes it possible to determine regularly, at each contact phase, the actual value $D_{1(k+1)}$ of the distance $D_1$ between the magnet 6 and the tip 4 of the stylus 3. Thus, the locating precision of the position $P_P$ of the tip 4 of the magnet 6 is thereby improved. Location errors are thus limited in the case where the magnet 6 would be moved from its initial position corresponding to the distance $D_0$, and therefore so are errors in locating the tip 4 of the stylus 3.

FIG. 4B is a schematic and partial sectional view of a utensil 3 of a tracking system 1 according to an alternative embodiment, for which the tip 4 has a rounded shape. In this second situation, there is no coincidence, during contact, between the position $P_P$ of the end of the tip 4, the position $P_I$ of the point I, and the contact position $P_C$.

When the tip 4 has a curved shape (circular, oval or other), it appears that the magnetic moment $\underline{m}$ is inclined relative to the Z-axis by a non-zero angle of inclination $\varphi$, the position $P_P$ does not coincide with the projected position $P_I$ and that the contact of the tip 4 takes place at the actual contact position $P_C$ separate from the position $P_I$. It is considered herein that the spacing between the positions $P_I$ and $P_c$ is large enough for it to be taken into consideration, for example when it is greater than the thickness of the line shown on a graphical interface. Otherwise, this case is the same as the first situation described in FIG. 4A.

In this case, in which the angle of inclination $\varphi$ that the magnetic moment $\underline{m}$ forms with the Z-axis is non-zero, the tip 4 is formed of:

- an end area located in the extension of the longitudinal axis $\Delta$, and where the position $P_P$ (located on the longitudinal axis $\Delta$) is defined; and
- a contact area, separate from the end area, at which the contact with the reference surface 2 takes place, and where the actual contact position $P_C$ is defined.

The actual contact position $P_c$ can be determined on the basis of the position $P_I$ determined previously during step 33, and on the basis of information relating to the shape of the tip 4 pre-recorded during step 11. In this example, where the tip 4 has a circular curved shape, such recorded geometric information relating to the shape of the tip 4 may include the value of a radius R of a sphere inscribed within the surface of the tip 4, and passing through the curved segment $[P_P; P_C]$.

Thus, the actual value $D_{1(k+1)}$ of the distance $D_1$ between the magnet 6 and the tip 4 can be calculated on the basis of the calculation of the value $D_{1I(k+1)}$ of the projected distance $D_{1I}$ and recorded geometric information of the tip 4 (e.g. herein circular shape of radius R centered on $P_R$) and the angle of inclination $\varphi$ formed by the magnetic moment $\underline{m}$ relative to the Z-axis. Thus, by way of example, it is possible first to calculate the distance $\|\underline{P_A P_I}(t_n)\|$ and to deduce therefrom the position $P_I(t_n)$ ($\overline{OP_I} = \overline{OP_A} + \underline{P_A P_I}$). Next, the position $P_c(t_n)$ is calculated herein on the basis of the position $P_I(t_n)$ determined, of the calculation of the vector $\underline{e_c}$ whose norm is herein equal to $e_c = R \times \tan(\varphi)$ (the norm depends on the recorded geometric information of the shape of the tip 4) and the orientation corresponds to the projection of the magnetic moment $\underline{m}$ in the plane XY. The angle of inclination $\varphi$ is calculated on the basis of the coordinates of the magnetic moment $\underline{m}$. Then, the position $P_p(t_n)$ is calculated especially on the basis of the position $P_c(t_n)$ and geometric information of the tip 4 (and optionally of the angle $\varphi$). Of course, this example is given by way of illustration, and there are different possibilities for determining the actual value $D_{1(k+1)}$ of the distance $D_1$ on the basis of the distance $\|\underline{P_A P_I}(t_n)\|$ and of the recorded geometric information of the shape of the tip 4.

Alternatively and in the particular case of a tip 4 of curved and circular shape, it is also possible to calculate: $\|\underline{P_A P_R}(t_n)\| = (h_{A,z}(t_n) - R) \times \|\underline{m}\| / m_z(t_n)$. $h'_{A,z}(t_n)$ is denoted as the value $h_{A,z}(t_n) - R$. Also, the calculation of $\|\underline{P_A P_R}\|$ indirectly matches the calculation of $\|\underline{P_A P_I}\|$ and therefore of the value $D_{1I(k+1)}$ of the distance $D_{1I}$. Also, at the current instant $t_n$, the distance $\|\underline{P_A P_R}\|$ of the vector going from the position $P_A$ of the magnet 6 to the position $P_R$ of the center of the inscribed circle is equal to the distance $h'_{A,z}$ of the position $P_A$ of the magnet 6 relative to a plane XY passing through the position $P_R$, multiplied by the norm $\|\underline{m}\|$ of the magnetic moment $\underline{m}$ divided by the coordinate $m_Z$ of the magnetic moment $\underline{m}$ along the Z-axis. The position $P_R$ is thus determined: $\overline{OP_R} = \overline{OP_A} + \underline{P_A P_R}$. After having determined the coordinates of the position $P_R$ in the OXYZ coordinate system, the position in the plane XY of the actual contact position $P_c$ is then obtained directly: these are the coordinates in the plane XY of the position $P_R$.

Other approaches are possible for determining the position $P_C$, which for example depend on the geometric model of the shape of the tip 4 pre-recorded in the computing unit 11 during step 11.

Figure 5:
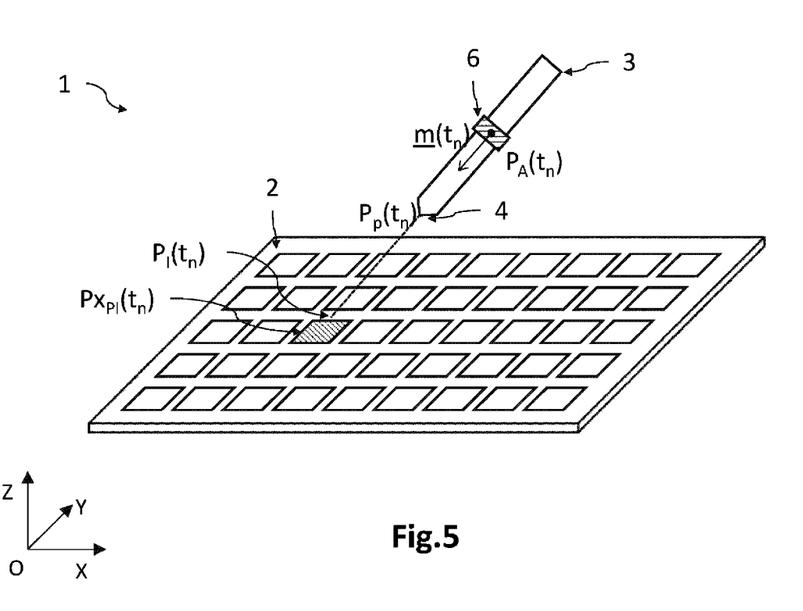
FIG. 5 is a schematic and partial perspective view of a system for tracking the tip of a utensil according to one alternative embodiment, during a non-contact phase.

FIG. 5 is a schematic and partial perspective view of a tracking system 1 similar to that described with reference to FIG. 1, wherein the touch sensor 20 activates only the pixel(s) $Px_{PI}(t_n)$ closest to the position $P_I(t_n)$ of the point of intersection I, and herein when the position $P_P$ is less than or equal, along the Z-axis, to a predefined threshold value $P_{P,th}$.

Thus, the processing unit of the touch sensor 20 receives these data only when the position $P_P$ of the tip 4 along the Z-axis is less than or equal to the threshold value $P_{P,th}$. When this is not the case, the touch sensor 20 can be inactive, that is to say not electrically powered totally or partly, so as to limit the electrical consumption of the tracking system 1.

When the position $P_P$ is, along the Z-axis, less than or equal to the threshold value $P_{P,th}$, the touch sensor 20 is rendered active. It then receives the projected position $P_I$ or $P_V$ at the current instant (herein the position $P_I$), for as long as the contact is not detected.

The processing unit then determines the pixel(s) $Px_{PI}$ closest to the position $P_I$. Only these pixels are then activated by the processing unit in order to detect the contact of the tip 4 on the reference surface 2.

The processing unit then performs the measurement only of the closest pixel $Px_{ref}$ and not of all the pixels in the matrix. The electrical control signal is therefore transmitted only to the closest pixels $Px_{PI}$ while the other pixels are not electrically powered. Next, the electrical response signal is received by the processing unit. Thus, the control/reading latency of the pixels is greatly reduced, insofar as it involves herein reading only a few pixels for each measurement instant, and not in this case 2500 pixels. Consequently, the electrical consumption is also greatly reduced.

According to another embodiment, the end 4' of the stylus 3, opposite the tip 4 along the longitudinal axis $\Delta$, can also be functionalized and thus be tracked by the tracking system 1. By way of example, the stylus 3 may include an eraser at the end 4', or a writing tip having characteristics different from those of the tip 4. Also, this end 4' can also be intended to come into contact with the reference surface 2.

As shown in FIG. 1, $D_2$ is denoted as the distance between the magnet 6 and the end 4' along the longitudinal axis $\Delta$. When, during the use of the stylus 3, the magnet 6 is moved relative to its original position, and the distance $D_2$ then has an actual value different from its recorded initial value.

The tracking method is then suitable for tracking, in addition to the tip 4, the end 4' as well. In such a case, the method is similar to that described previously with reference to FIG. 3. It differs therefrom essentially by the following elements.

During step 11, the digital model of the stylus 3 recorded in the computing unit 11 includes, in addition to the initial value $D_{1(k=0)}$ of the magnet 6–tip 4 distance, the initial value $D_{2(k'=0)}$ of the magnet 6–end 4' distance.

During step 21 of handling the stylus 3, there is an alternation between contact phases and non-contact phases of one of the ends 4 and 4' on the reference surface 2. One contact phase may concern the tip 4, and the following contact phase may concern the end 4' (these two successive contact phases being separated by a non-contact phase of the stylus 3 on the reference surface 2).

During step 23, for the rest of the tracking method, one orientation of the magnetic moment $\underline{m}$ is assigned to the tip 4, and therefore the opposite orientation is assigned to the opposite end 4'. This step may be carried out as described previously. It consists of determining which orientation $+\underline{m}$ or $-\underline{m}$ of the magnetic moment $\underline{m}$ is directed toward the tip 4. Thus, knowing the orientation $+\underline{m}$ or $-\underline{m}$ of the magnetic moment $\underline{m}$, it is known which end of the stylus 3 is in contact with the reference surface 2.

During step 24, the touch sensor 20 detects the contact of one end of the stylus 3 on the reference surface 2. Knowledge of the orientation $+\underline{m}$ or $-\underline{m}$ of the magnetic moment $\underline{m}$ relative to the tip 4 makes it possible to determine whether the end in contact is the tip 4 or the end 4'. Thus, the tracking system 1 "knows" which actual value of the distance $D_1$ or $D_2$ will have to be determined. By way of example, in the case where the orientation $+\underline{m}$ is directed toward the tip 4 and it is herein directed toward a direction opposite the reference surface, the tracking system 1 determines that the contact relates to the end 4' and that it will determine the actual value of the distance $D_2$. The processing unit then determines the value of a parameter $\kappa'(t_n)$ representative of the contact of the end 4' on the reference surface 2. This parameter $\kappa'$ is similar to the parameter $\alpha$ except that it is associated with the end 4'.

During step 31, in this example where there is contact between the end 4' and the reference surface 2, the computing unit 11 then determines the actual value of the distance $D_2$ between the magnet 6 and the end 4' and then increments the indicator k' by one unit: k'+1. Herein, this indicator keeps the same value as long as the same contact phase continues. Furthermore, the indicator k associated with the tip 4 remains unchanged.

To determine the actual value $D_{2(k+1)}$ of the distance $D_2$, the computing unit 11 determines the distance $D_{2I}$ separating the position $P_A$ of the magnet 6 and the position $P_I$ of the point I, the point I still being defined as the point of intersection between the reference surface 2 and the straight line parallel to the magnetic moment $\underline{m}$ and therefore passing through the end 4' (and through the tip 4). Similar to what was described previously, the actual value of the distance $D_{2(k'+1)}(t_n)$ is equal to $\|\underline{P_A P_I}(t_n)\|$: $D_{2(k'+1)}(t_n) = \|\underline{P_A P_I}(t_n)\|$.

During step 32, the computing unit 11 updates the recorded value of the distance $D_{2(k'+1)}$ between the magnet 6 and the end 4' in the memory 13.

During step 33, the computing unit 11 determines the position $P_P(t_n)$ of the end 4' on the reference surface 2 at the current instant, on the basis of the state vector $X_A(t_n)$ determined beforehand, and on the basis of the updated distance $D_{2(k'+1)}$.

The other steps are identical or similar to those described previously. Thus, at each contact phase, the distance $D_1$ (magnet–tip 4) or distance $D_2$ (magnet–end 4') is updated, and the corresponding indicator k or k' is incremented. The beneficial result is a stylus 3 whose two opposite ends 4, 4' can be tracked and in which the contact of each of them on the reference surface 2 makes it possible to update its actual distance that separates it from the magnet 6. Errors in locating are thus limited for each of these ends 4, 4', in the case where the magnet 6 is moved relative to its original position.

Particular embodiments have just been described. Various variants and modifications will appear to the skilled person.

The invention claimed is:

1. A method for tracking a first end of a utensil handled by a user, a magnetic object being securely fastened to the utensil and separated from the first end along a longitudinal axis $\Delta$ of the utensil by a first non-zero distance ($D_1$), the magnetic object having a magnetic moment m collinear with the longitudinal axis $\Delta$, the method including the following steps:

handling the utensil by a user, the first end being alternately in contact and not in contact with a reference surface, measuring a magnetic field emitted by the magnetic object at different successive measurement instants, by means of an array of magnetometers ($M_i$) securely fastened to the reference surface;

determining a state vector $X_A(t_n)$ representative of the position $P_A(t_n)$ and the magnetic moment $\underline{m}(t_n)$ of the magnetic object, on the basis of the measurements of the magnetic field;

determining the position $P_P(t_n)$ of the first end of the utensil on the basis of the state vector $X_A(t_n)$ and of a previously recorded value ($D_{1(k)}$) of the first distance ($D_1$) between the first end and the magnetic object;

wherein, the first distance ($D_1$) being modified, during the handling of the utensil while the first end is not in contact with the reference surface, by translation of the magnetic object along the longitudinal axis $\Delta$ such that it has a value, referred to as the actual value, ($D_{1(k+1)}$) that is different from the recorded value ($D_{1(k)}$), the method includes the following steps:

determining a parameter $\kappa(t_n)$ representative of a contact between the first end and the reference surface belonging to a touch sensor, and when contact is detected by the touch sensor:

determining a value ($D_{1I(k+1)}$) of a first distance, referred to as the projected distance ($D_{1I}$), which is equal to a distance between the position $P_A(t_n)$ of the magnetic object and a position $P_I(t_n)$ of a point of intersection I between the reference surface and a straight line collinear with the magnetic moment $\underline{m}(t_n)$; then determining the actual value ($D_{1(k+1)}$) of the first distance ($D_1$) on the basis of the determined value ($D_{1I(k+1)}$) of the first projected distance ($D_{1I}$);

updating the recorded value of the first distance ($D_1$) by replacing the previous recorded value ($D_{1(k)}$) with the actual determined value ($D_{1(k+1)}$) of the first distance ($D_1$).

2. The method according to claim 1, wherein the value ($D_{1I(k+1)}$) of the first projected distance ($D_{1I}$) is determined on the basis of a norm $\|\underline{P_A P_I}(t_n)\|$ of a first vector $\underline{P_A P_I}(t_n)$ going from the position $P_A$ of the magnetic object to the position $P_I$ of the point of intersection I, this norm $\|\underline{P_A P_I}(t_n)\|$ of the first vector $\underline{P_A P_I}(t_n)$ being determined on the basis of a norm $\|\underline{m}\|$ of the magnetic moment $\underline{m}$, of the coordinate $m_z$ of the magnetic moment along a vertical axis orthogonal to the plane of the reference surface, and on the basis of a first distance $h_{A,z}$ along the vertical axis between the position $P_A$ of the magnetic object and the reference surface.

3. The method according to claim 2, wherein, when the contact is detected, the position $P_I$ of the point of intersection I is determined on the basis of the position $P_A$ of the magnetic object and on the basis of the first vector $\underline{P_A P_I}(t_n)$, the latter being determined on the basis of the norm $\|\underline{P_A P_I}(t_n)\|$ previously determined, of the magnetic moment $\underline{m}$ and of the norm $\|\underline{m}\|$ of the magnetic moment.

4. The method according to claim 3, wherein, when contact is detected, the first end having a curved shape, and the magnetic moment $\underline{m}$ having a non-zero angle of inclination $\varphi$ relative to the vertical axis, so that the first end includes an end area located in the extension of the longitudinal axis $\Delta$, as well as a contact area, separate from the end area, at which the first end is in contact with the reference surface, an actual contact position $P_C$ is then determined on the basis of the position $P_A$ and of the magnetic moment $\underline{m}$ of the magnetic object, and on the basis of at least one pre-recorded geometric parameter representative of the curved shape of the first end.

5. The method according to claim 4, wherein the pre-recorded geometric parameter is the center of a sphere of radius R, one surface of which is locally tangent to a surface of the first end and passing through the position $P_P$ and the actual contact position $P_C$, the actual contact position $P_C$ being determined on the basis of the magnetic moment $\underline{m}$ and of its norm $\|\underline{m}\|$ and on the basis of a distance $h'_{A,z}$ along the vertical axis between the position $P_A$ of the magnetic object and a plane parallel to the reference surface and passing through the center of the sphere.

6. The method according to claim 4, wherein the actual contact position $P_C$ of the first end is displayed on a graphical interface.

7. The method according to claim 1, wherein the position $P_P$ of the first end, or a position of the first end determined by projection of the position $P_P$ on the reference surface along an axis collinear with the magnetic moment $\underline{m}$ or along a vertical axis orthogonal to the reference surface is displayed on a graphical interface.

8. The method according to claim 1, wherein the position $P_P$ of the first end is determined on the basis of the magnetic moment $\underline{m}$, of its norm $\|\underline{m}\|$, and of the recorded value of the first projected distance ($\overline{D}_{1I(k+1)}$), or when no update of the first distance ($D_1$) has yet occurred, of the pre-recorded value ($D_{1(k=0)}$) of said first distance ($D_1$).

9. The method according to claim 1, wherein the step of determining the first projected distance ($D_{1I(k+1)}$) is not carried out when the magnetic moment $\underline{m}$ of the magnetic object has an angle of inclination $\varphi$ greater than 60° relative to a vertical axis orthogonal to the plane of the reference surface.

10. The method according to claim 1, wherein the touch sensor is inactive as long as the position $P_P$ of the first end is greater than a predefined threshold value $P_{P,th}$ along a vertical axis orthogonal to the plane of the reference surface, and is electrically activated when the position $P_P$ is less than or equal to the threshold value $P_{P,th}$.

11. The method according to claim 1, wherein the touch sensor is a matrix sensor including a separate matrix of pixels securely fastened to the reference surface and suitable for providing an electrical response signal representative of a contact of the first end on the reference surface, the method including determining at least one pixel, referred to as the closest pixel, that has a distance relative to the position $P_I$ less than or equal to a predefined threshold value, only the closest pixel being activated to detect the contact.

12. The method according to claim 1, wherein the utensil includes a second end opposite the first end along the longitudinal axis $\Delta$, the magnetic object being remote from the second end along a longitudinal axis $\Delta$ by a non-zero second distance ($D_2$), the method comprising a step of determining the orientation $+\underline{m}$ or $-\underline{m}$ of the magnetic moment m directed toward the first end.

13. The method according to claim 12, additionally ensuring the tracking of the second end (4') of the utensil, the second distance ($D_2$) between the second end and the magnetic object being able to be modified during handling, and including the following steps:
during the step of handling of the utensil by a user, the second end is alternately in contact and not in contact with a reference surface during the handling of the utensil while the second end is not in contact with the reference surface, the second distance ($D_2$) is modified by translation of the magnetic object along the longitudinal axis $\Delta$ such that it has a second value, referred to as the actual value ($D_{2(k'+1)}$), that is different from a second recorded value ($D_{2(k')}$);
determining the position $P_P(t_n)$ of the second end of the utensil on the basis of the state vector $X_A(t_n)$, of the previously recorded value ($D_{2(k')}$) of the second distance ($D_2$), and of the orientation of the magnetic moment $\underline{m}$ toward the second end;
determining a parameter $\kappa'(t_n)$ representative of a contact between the second end and the reference surface, and when contact is detected by the touch sensor:
determining a value ($D_{2I(k'+1)}$) of a second distance, referred to as the projected distance ($D_{2I}$), which is equal to a distance between the position $P_A(t_n)$ of the magnetic object and a position $P_I(t_n)$ of a point of intersection I between the reference surface and a straight line collinear with the magnetic moment $\underline{m}(t_n)$, then;
determining the actual value ($D_{2(k'+1)}$) of the second distance ($D_2$) on the basis of the determined value ($D_{2(k'+1)}$) of the second projected distance ($D_{2I}$);
updating the recorded value of the second distance ($D_2$) by replacing the previous recorded value ($D_{2(k')}$) with the actual determined value ($D_{2(k'+1)}$) of the second distance ($D_2$).

14. A system for tracking a first end of a utensil, including:
a utensil,
intended to be handled by a user to cause the first end to be alternately in contact and not in contact with a reference surface,
a magnetic object being securely fastened to the utensil and separated from the first end along a longitudinal axis $\Delta$ of the utensil by a first non-zero distance ($D_1$) that may vary during the handling of the utensil by a user by translation of the magnetic object along the longitudinal axis $\Delta$ such that it has a value, referred to as the actual value ($D_{1(k+1)}$), that is different from a recorded value ($D_{1(k)}$), the magnetic object having a magnetic moment $\underline{m}$ collinear with the longitudinal axis $\Delta$;

a locating device, including:

an array of magnetometers ($M_i$), securely fastened to the reference surface, and suitable for measuring a magnetic field emitted by the magnetic object;

an electronic computing unit, comprising a recorded value of the first distance ($D_{1(k)}$), and being suitable for determining a state vector $X_A$ representative of a position $P_A$ and of the magnetic moment $\underline{m}$ of the magnetic object on the basis of the measured magnetic field, determining a position $P_P$ of the first end on the basis of the state vector $X_A$ and of a recorded value of the first distance ($D_1$);

when contact is detected between the first end and the reference surface by a touch sensor, determining a value ($D_{1I(k+1)}$) of a first distance, referred to as the projected distance ($D_{1I}$), which is equal to a distance between the position $P_A(t_n)$ of the magnetic object and a position $P_I(t_n)$ of a point of intersection I between the reference surface and a straight line collinear with the magnetic moment $\underline{m}(t_n)$, then determining the actual value ($D_{1I(k+1)}$) of the first distance ($D_{1i}$) on the basis of the determined value ($D_{1I(k+1)}$) of the first projected distance ($D_{1I}$); and updating the recorded value of the first distance ($D_1$) by replacing the previous recorded value ($D_{1(k)}$) with the actual determined value ($D_{1(k+1)}$) of the first distance ($D_1$);

the touch sensor, comprising the reference surface, suitable for detecting contact between the first end and the reference surface, and for transmitting the contact information to the locating device.

* * * * *

UNITED STATES PATENT AND TRADEMARK OFFICE
CERTIFICATE OF CORRECTION

PATENT NO. : 11,983,378 B2
APPLICATION NO. : 18/245472
DATED : May 14, 2024
INVENTOR(S) : Jean-Marie Dupre La Tour and Tristan Hautson Page 1 of 1

It is certified that error appears in the above-identified patent and that said Letters Patent is hereby corrected as shown below:

In the Claims

In Claim 10, Column 22, Line 2, after "reference" delete "surface," and insert --surface--

Signed and Sealed this
Third Day of December, 2024

Katherine Kelly Vidal
*Director of the United States Patent and Trademark Office*